(12) United States Patent
Detro et al.

(10) Patent No.: US 8,775,607 B2
(45) Date of Patent: Jul. 8, 2014

(54) IDENTIFYING STRAY ASSETS IN A COMPUTING ENVIROMENT AND RESPONSIVELY TAKING RESOLUTION ACTIONS

(75) Inventors: Gary L. Detro, Celina, TX (US); Joe Hackett, Flower Mound, TX (US); Leonard S. Hand, Red Creek, TX (US); Adam A. Nemati, Carrollton, TX (US)

(73) Assignee: International Business Machines Corporation, Armonk, NY (US)

( * ) Notice: Subject to any disclaimer, the term of this patent is extended or adjusted under 35 U.S.C. 154(b) by 787 days.

(21) Appl. No.: 12/964,894

(22) Filed: Dec. 10, 2010

(65) Prior Publication Data

US 2012/0151036 A1    Jun. 14, 2012

(51) Int. Cl.
*G06F 15/173*    (2006.01)

(52) U.S. Cl.
USPC .............................. 709/224; 709/223; 726/25

(58) Field of Classification Search
None
See application file for complete search history.

(56) References Cited

U.S. PATENT DOCUMENTS

| | | | |
|---|---|---|---|
| 7,225,466 B2 * | 5/2007 | Judge | 726/22 |
| 7,426,654 B2 * | 9/2008 | Adams et al. | 714/4.3 |
| 7,694,150 B1 * | 4/2010 | Kirby | 713/188 |
| 8,112,451 B1 * | 2/2012 | Graham et al. | 707/802 |
| 8,220,054 B1 * | 7/2012 | Lu | 726/24 |
| 2003/0212775 A1 * | 11/2003 | Steele et al. | 709/223 |
| 2004/0117624 A1 * | 6/2004 | Brandt et al. | 713/166 |
| 2004/0177624 A1 * | 9/2004 | Wo | 62/125 |
| 2005/0081115 A1 * | 4/2005 | Cheng et al. | 714/47 |
| 2006/0064481 A1 * | 3/2006 | Baron et al. | 709/224 |
| 2006/0195905 A1 * | 8/2006 | Fudge | 726/25 |
| 2007/0043860 A1 * | 2/2007 | Pabari | 709/224 |
| 2007/0105589 A1 * | 5/2007 | Lu | 455/556.2 |
| 2007/0240157 A1 * | 10/2007 | Herenyi et al. | 718/1 |
| 2008/0072229 A1 * | 3/2008 | Kirton et al. | 718/104 |
| 2008/0133861 A1 | 6/2008 | Holt | |
| 2009/0182610 A1 | 7/2009 | Palanisamy et al. | |
| 2009/0182812 A1 | 7/2009 | Bajpay et al. | |

(Continued)

FOREIGN PATENT DOCUMENTS

WO    WO2009020472           2/2009
WO    WO 2009020472 A1  *   2/2009

OTHER PUBLICATIONS

Zwick, R., et al. "A Strategic Blueprint to Increase Return on Assets." Hitachi: Inspire the Next. Apr. 2009.

*Primary Examiner* — Venkat Perungavoor
*Assistant Examiner* — Christopher Ruprecht
(74) *Attorney, Agent, or Firm* — Patents on Demand P.A.; Brian K. Buchheit; Scott M. Garrett

(57) ABSTRACT

In a discovery stage, a set of suspect rules can be utilized to determine if each environment asset of the computing environment is to be considered a suspect asset or a standard environment asset, where suspect assets are a subset of environment assets of the computing environment. In a confirmation stage, a set of stray rules can be used to determine whether each suspect asset is to be considered a stray asset, wherein stray assets are a subset of the suspect assets. A stray asset can be an asset defined and configured by a configuration management system that is active in the computing environment and is consuming resources of the computing environment yet is not needed by active processes of the computing environment and is unneeded by other active environment assets. For each stray asset, at least one resolution action (e.g., alert action, containment action, delete action) can be performed.

17 Claims, 4 Drawing Sheets

(56) References Cited

U.S. PATENT DOCUMENTS

| | | |
|---|---|---|
| 2009/0249284 A1* | 10/2009 | Antosz et al. ............... 717/104 |
| 2010/0058093 A1* | 3/2010 | Danieli et al. ............... 713/340 |
| 2010/0082512 A1* | 4/2010 | Myerson et al. ............. 706/45 |
| 2010/0082803 A1* | 4/2010 | Nguyen ........................ 709/224 |
| 2011/0016417 A1* | 1/2011 | Shiplacoff et al. ........... 715/768 |
| 2011/0055597 A1* | 3/2011 | Wyatt ........................... 713/300 |
| 2011/0055920 A1* | 3/2011 | Hariri ........................... 726/22 |
| 2011/0161452 A1* | 6/2011 | Poornachandran et al. .. 709/207 |
| 2011/0289308 A1* | 11/2011 | Sobko et al. ................. 713/100 |
| 2012/0054554 A1* | 3/2012 | Dagan .......................... 714/39 |

\* cited by examiner

IDENTIFYING STRAY ASSETS IN A COMPUTING ENVIROMENT AND RESPONSIVELY TAKING RESOLUTION ACTIONS

BACKGROUND

The present invention relates to the field of asset management and, more particularly, to identifying stray assets in a computing environment and responsively taking resolution actions.

In today's large-scale computing environments, interaction between components and/or assets are often complex. Because of this, specially-designed software tools have been developed to allow users to create configuration items at a high-level (or variable level) of abstraction. Configuration items (CIs) can be for relatively persistent assets, such as those having a lifetime that extends over weeks, months, or even years. Configuration items can also be defined at the transactional level. Software tools for CIs allow users to use graphics and/or natural language constructs to express the environment assets. The tools also permit users to manipulate, monitor, and combine environment assets at the asset level, hiding the deeper complexities and interactions.

For example, a software tool can allow a user to express a step of the process/workflow simply as "Create an Application Server". Thus, the user need not understand the specific steps and system details required to fulfill this step of the process/workflow; only that the tool will translate this statement into the proper code that will create the application server and all related changes required to make the server accessible.

Unfortunately, these deeper complexities and interactions are also often hidden from other systems (e.g., a configuration management (CM) or software management system) that monitor and keep the components/assets of the computing environment in the proper working order. Using the above example, a monitoring system would be capable of determining that there is a relationship between the requesting service/application/asset and the inventory database. However, such systems are typically unable to identify or handle the auxiliary actions that are sometimes required to enact the workflow/process step.

For example, a modification may need to be made to the firewall configuration (i.e., a firewall "pinhole") in order to for the requestor to access the application server. Since the monitoring system is unaware of this additional side process, the change to the firewall remains after the step of the workflow/process is completed and is accessible to any other service/application/asset, internal or external, whether or not required.

Thus, when the asset (i.e. application server) is relinquished, the high-level of abstraction provided by process/workflow definition tools have created situations within the computing environment where functionality is left stray and unresolved.

BRIEF SUMMARY

In a discovery stage of one embodiment of the invention, a set of suspect rules can be utilized to determine if each environment asset of the computing environment is to be considered a suspect asset or a standard environment asset, where suspect assets are a subset of environment assets of the computing environment. In a confirmation stage, a set of stray rules can be used to determine whether each suspect asset is to be considered a stray asset, wherein stray assets are a subset of the suspect assets. A stray asset can be an asset defined and configured by a configuration management system that is active in the computing environment and is consuming resources of the computing environment yet is not needed by active processes of the computing environment and is unneeded by other active environment assets. For each stray asset, at least one resolution action (e.g., alert action, containment action, delete action) can be performed.

DETAILED DESCRIPTION

Figure 1:
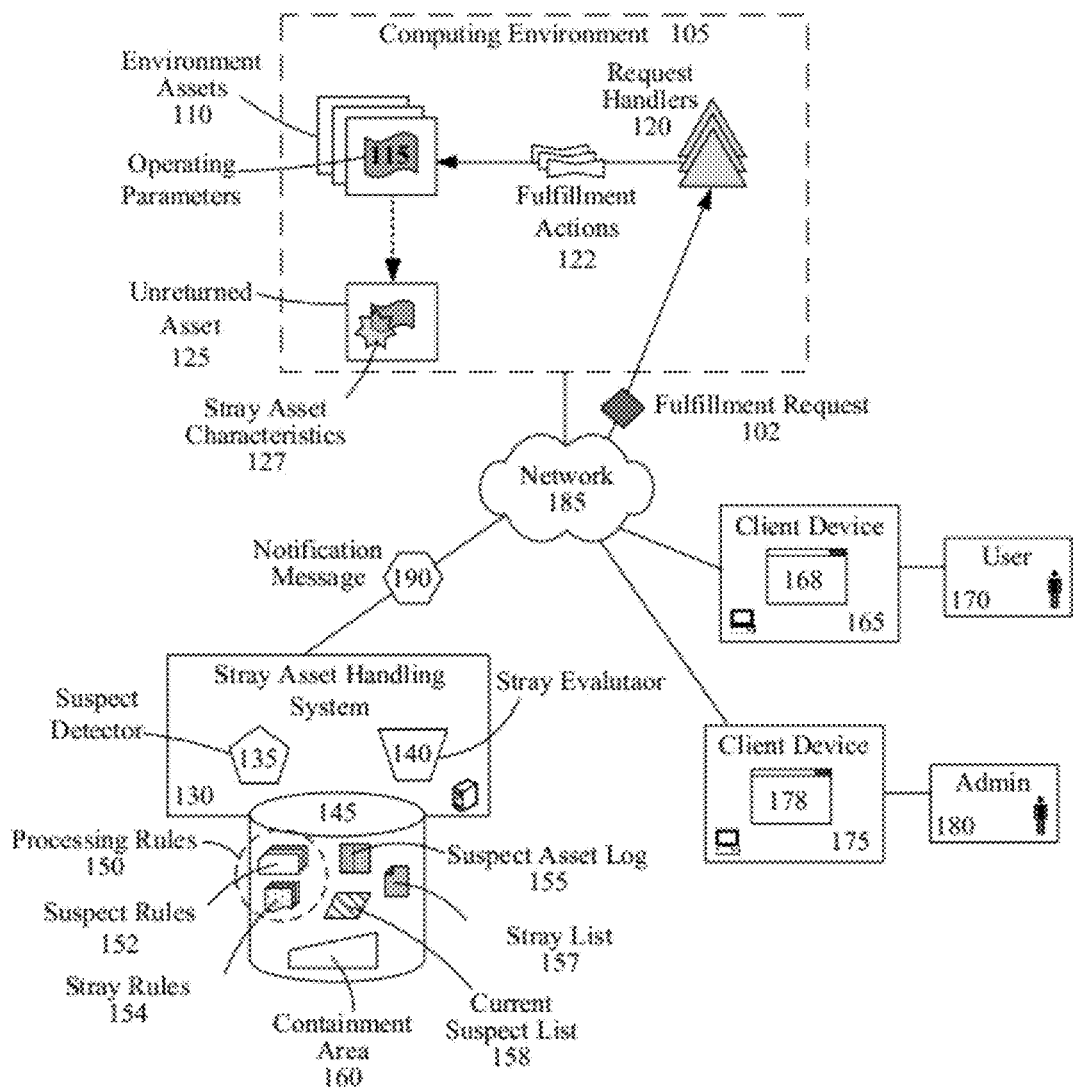
FIG. 1 is a schematic diagram illustrating a system that utilizes stray asset handling system to discover and resolve stray asset characteristics that exists within a computing environment in accordance with embodiments of the inventive arrangements disclosed herein.

The present invention discloses a solution that identifies stray assets in a computing environment and is able to take one or more resolution actions. A stray management system can utilize a suspect detector with user-developed suspect rules to identify environment assets whose functionality is potentially stray. For example, the suspect rules can define a signature consisting of a set of abnormal characteristics for an asset, which is compared against operational characteristics of the environment assets.

In this context, stray can refer to an environmental asset left in an enabled or active state when the intended lifespan of the environment asset has ended. One reason for this is a user in control of an environment asset can permit another to "borrow" an asset (or can themselves unofficially repurpose the environment asset) after its intended purpose has been fulfilled, which results in a significant amount of waste of computing resources.

Once suspect environment assets have been identified, additional rules, referred to as stray rules, can be triggered to determine whether the suspect asset matches additional characteristics of a stray asset. When so, the suspect asset is re-categorized as a stray asset. Additionally, other rules and/or conditions can indicate that the suspect asset is in fact normal, and it can be re-categorized as a normal environment asset. Stray assets (i.e., suspect assets confirmed as having stray asset characteristics) can be handled based on a predefined resolution actions contained in the stray rules. These resolution actions can include notifying an appropriate administrator of the stray action, quarantining or containing the stray asset, and/or removing the stray asset and freeing the related computing resources.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a system 100 that utilizes stray asset handling system 130 to discover and resolve stray asset characteristics 127 that exists within a computing environment 105 in accordance with embodiments of the inventive arrangements disclosed herein. In system 100, the stray asset handling system 130, herein referred to as the stray asset handling system 130, can monitor the environment assets 110 of a computing environment 105 to identify stray asset characteristics 127 to detect which of the environment assets 110 are stray assets. A stray asset can refer to an environmental asset 110 left in an enabled or active state when the intended lifespan of the environment asset 110 has ended.

The computing environment 105 can represent a variety of environment assets 110 arranged in a variety of configurations for the purpose of performing computer-based tasks. The computing environment 105 can also include internal and/or secondary networks (not shown) in addition to network 185 for communication and data exchanges.

As used here, the term "environment asset 110" refers to a component of the computing environment 105 that is required in order for the computing environment 105 to perform required tasks. Environment assets 110 can represent system components, hardware components, software components, firmware components, and/or middleware components. Examples of environment assets 110 can include, but are not limited to, servers, databases, a configuration management (CM) system, the configuration items stored within a CM system, electronic services, electronic files, software applications, routers, firewalls, and the like. Environment assets 110 can be a dynamically defined configuration item (CI), which is a fundamental structural unit of a the configuration management (CM) system.

An environment asset 110 can include a set of one or more operating parameters 115. These operating parameters 115 can represent the values of various attributes specific to the type of environment asset 110 and/or the conditions that the environment asset 110 is operating under. Examples of operating parameters 115 can include, but are not limited to, security settings, parent process, metadata, versioning information, file attributes, configuration data, and the like.

The types of environment assets 110 used within a computing environment 105 can vary based upon the architecture and design of the computing environment 105. The computing environment 105 can include request handlers 120 that process fulfillment requests 122.

Fulfillment requests 122 can represent a variety of electronic messages that request access to one or more environment asset 110. Fulfillment requests 122 can be generated by entities external or internal to the computing environment 105. For example, running of a business process or workflow can generate multiple fulfillment requests 122 to perform the steps of the process/workflow.

A request handler 120 can represent the environment assets 110 (e.g., hardware, software, etc.) necessary to determine the appropriate fulfillment actions 122 to fulfill a received fulfillment request 102. For example, a Web server 120 can receive a Web request 102 for a Web page 110. The Web server 120 then executes one or more fulfillment actions 122 (i.e., compiles an active server page (ASP), executes a search query, etc.) in order to provide the requested Web page 110 to the requestor.

Fulfillment actions 122 can represent executable instructions whose performance is required to satisfy the corresponding fulfillment request 102. In some instances, a fulfillment action 122 can be or generate a fulfillment request 102. Using the previous example, a fulfillment action 122 run by the Web server 120 can be a fulfillment request 102 to a database server 110 to retrieve Web content.

The fulfillment actions 122 run by a request handler 120 can be determined from a set of predefined responses and can be influenced by the operating parameters 115 of the various environment assets 110 involved. Fulfillment actions 122 can be akin to the low-level steps generated by software tools that use a high level of abstraction for business process/workflow definition.

For example, using such a software tool a step can be created in a business process/workflow that states "Create Disk Space". While this step is simply stated or graphically created by a user, the software tool can be programmed to automatically translate "Create Disk Space" into multiple fulfillment actions 122 that address any security or data-related tasks that need to be performed in addition to the actual communication between the computing environment 105 and the bank server.

The automated creation of fulfillment actions 122 by software tools at a high level of abstraction can result with changes being made to environment assets 110 that can be overlooked by software systems and/or applications used to clean-up the computing environment 105. That is, a management system/application that is unaware of the specific changes and/or affected environment assets 110 cannot ensure that the integrity of those environment assets 110.

Building upon the previous example, the software tool can translate "Create Disk Space" into 2 main fulfillment actions 122—allocate space and establish security context. The "establish security context" action 122 can have additional fulfillment actions 122—establish connection and encrypt data—that get generated as it executes. Each of these fulfillment actions 122 can generate additional fulfillment actions 122, and so on until processing is completed.

While a management system/application may be able to track environment assets 110 used by the main fulfillment actions 122 for this process, environment assets 110 affected by the lower-level fulfillment actions 122 or undocumented manual changes can be easily overlooked. As used herein, the term "stray asset characteristics" is used to refer to characteristics an environment asset 110 whose functionality has not been reverted to its normal or standard operating state after the fulfillment actions 122 for a fulfillment request 102 are complete.

For example, using the previous scenario, a low-level fulfillment action 122 can create a pinhole in the firewall 110 to communicate with the storage server. Should a fulfillment action 122 not exist to revert the operating state of the firewall 110 and/or a management system/application is unaware that this change is made as part of the business process/workflow, then the pinhole in the firewall 110 can persist long after invoking the business process/workflow to relinquish the storage. This situation can compromise the security of the computing environment 105, allowing unauthorized access to external entities.

For the sake of clarity, environment assets 110 having stray asset characteristics 127 shall be referred to herein as unreturned assets 125 as the environment asset 110 has not been returned to its normal operating state. As various fulfillment actions 122 are performed within the computing environment 105 during the course of typical activities, a variety of unreturned assets 125 can be inadvertently created.

The stray asset handling system 130 can represent a software system configured to address unreturned assets 125 within the computing environment 105. In one embodiment, a two-stage approach can be used by the stray asset handling system 130, where the first stage is a discovery stage and the second stage is a confirmation stage. In a first stage, suspect assets (which are a subset of the environment assets 110) can be detected. In the second stage, suspect assets can be determined to be stray assets (which are a subset of the stray suspect assets) or can be re-evaluated as normal environment assets 110. Each stage can be performed independently and at different frequencies. The two stage approach, while beneficial from a scalability and processing efficiency approach is not meant to be limiting on the disclosure and embodiments having a single stage or more than two stages are contemplated.

The stray asset handling system 130 can include a suspect detector 135, a stray evaluator 140, and a data store 145 containing processing rules 150 and a variety of supporting data items. The suspect detector 135 can represent the software component of the stray asset handling system 130 configured to discover unreturned assets 125. To do so, the suspect detector 135 can utilize a set of suspect rules 152 when assessing environment assets 110. The suspect rules 152 are expected to determine a likely set of unreturned assets 125 along with an expected and significant set of false-positives. Suspect rules 152 can be aggressively constructed so that all (or nearly all) environment assets 110 that are potentially unreturned assets 125 are detected.

The suspect rules 152 can represent a subset of processing rules 150 that define conditions and/or process steps for the identification of stray asset characteristics 127. In one embodiment, the suspect rules 152 can include conditional sets of operating parameters 115 that define acceptable and operating states of the environment assets 110.

For example, a discovery rule 152 can indicate that routers (one type of environmental asset 110) identified as "Main" and "Web" should have ports 80 and 443 open. In another example, a discovery rule 152 can define that port 1194 should only be open on a router when there is an active OPENVPN session. Thus, a "signature" of a suspect router (one type of environment asset 110) can be that port 1194 is open when no active OPENVPN session exists. It should be emphasized that the different signatures or stray asset characteristics 127 detected using the suspect rules 152 and stray rules 154 can be customized to specific types of environmental assets 110, as indicated by the above router example.

When the suspect detector 135 identifies an environment asset 110 as potentially having stray asset characteristics 127, data about the environment asset 110 can be recorded in the suspect asset log 155 and an identifier of the environment asset 110 can be added to the current suspect list 158. The suspect asset repository 155 can represent a historical record of environment assets 110 that have been noted as operating in an unknown or undefined state.

The current suspect list 158 can represent a listing of environment assets 110 that have been identified by the suspect detector 135 as potential unreturned assets 125 since the last time the stray evaluator 140 was invoked. That is, the current suspect list 158 can represent the environment assets 110 that the stray evaluator 140 needs to process when it is run.

The stray evaluator 140 can represent the software component of the stray functionality system 130 configured to determine if an environment asset 110 noted by the suspect detector 135 is an unreturned asset 125 and can initiate resolution actions to return computing resources consumed by the unreturned asset 125. To perform its tasks, the stray evaluator 140 can utilize stray rules 154, the suspect asset log 155, the current suspect list 158, the stray list 157, and the containment area 160 of data store 145.

As previously mentioned, the current suspect list 158 can represent the environment assets 110 for which the stray evaluator 140 is to confirm the existence of stray asset characteristics 127. The stray list 157 can represent a historical listing of environment assets 110 that have been previously confirmed as unreturned assets 125. In addition to an identifier of the environment asset 110, the stray list 157 can include pertinent operating parameters 115 of the environment asset 110 and/or computing environment 105 for which the environment asset 110 was confirmed as having stray asset characteristics 127.

The stray rules 154 can represent the subset of processing rules 150 used by the stray evaluator 140 to determine stray asset characteristics 127 for an environment asset 110. Unlike suspect rules 152, the stray rules 154 can represent more complex relationships that take into account time parameters and/or the operating context of the environment asset 110, as well as include potential resolution actions that can be performed to handle the unreturned asset 125.

For example, in order to confirm that virtual network (e.g. VPN) port forwarder 110 is indeed stray asset characteristics 127, the stray rules 154 for this environment asset 110 would need to express an understanding of the port and the target of the port to confirm that the target is actually unavailable or is not the intended target.

As another example, a stray rule 154 can express that any environment asset 110 must be recorded by the suspect detector 135 in the suspect asset log 155 a minimum of five times before other applicable stray rules 154 can be applied.

Upon completion of processing, the stray evaluator 140 can perform various tasks based upon the resolution action prescribed in the stray rules 154. Examples of resolution actions can include, but are not limited to, an ALERT action, a CONTAIN action, a DELETE action, and the like.

The CONTAIN resolution action can require the use of the containment area 160. The containment area 160 can represent a storage space in which unreturned assets 125 can be "stored" for possible reactivation within the computing environment 105. The CONTAIN action can be thought of as similar to quarantine actions performed by anti-virus applications.

In another embodiment, the containment area 160 can exist in a separate data store remotely located from, but accessible by the stray functionality system 130.

In yet another embodiment, the suspect detector 135 and the suspect rules 152 can be grouped as a separate operational entity from the stray evaluator 140 and its supporting data items 154 and 157. In such an embodiment, accessibility to shared data items 155 and 158 would need to be maintained.

Many of the resolution actions can instruct the stray functionality system 130 to send a notification message 190 to a designated user 170 or administrator 180. A notification message 190 can be an electronic message (e.g., email, instant message) informing the user 170 or administrator 180 of the stray asset characteristics 127 and/or any resolution action that has been taken. Designation of the user 170 to whom the notification message 190 is sent can be incorporated into the stray rules 154, obtained from the specific system housing the unreturned asset 125, and/or provided by a lookup service.

In one illustrative instance, for a stray asset that is a process, the stray asset handling system 130 can identify a username associated with the process and cross-reference the username with a logon roster having an associated email address. The notification message 190 can then be sent to the email address.

The user 170 can then access the pertinent information associated with the notification message 190 using a dashboard interface 168 running on a client device 165. The dashboard interface 168 can represent a graphical interaction mechanism by which the user 170 can access the stray asset handling system 130. From the dashboard interface 168, the user 170 can perform various allowed actions, such as viewing the records from the suspect asset log 155 for an environment asset 110 and inputting a resolution action to be performed for an unreturned asset 125.

Information input into the dashboard interface 168 by the user 170 can notify the administrator 180 that processing rules 150 need to be created or modified. The administrator 180 can perform activities related to the processing rules 150 using the rules interface 178 running on a client device 175. The rules interface 178 can represent a graphical user interface (GUI) in which the administrator 180 can manage the processing rules 150 for the stray functionality system 130.

Network 185 can include any hardware/software/and firmware necessary to convey data encoded within carrier waves. Data can be contained within analog or digital signals and conveyed though data or voice channels. Network 185 can include local components and data pathways necessary for communications to be exchanged among computing device components and between integrated device components and peripheral devices. Network 185 can also include network equipment, such as routers, data lines, hubs, and intermediary servers which together form a data network, such as the Internet. Network 185 can also include circuit-based communication components and mobile communication components, such as telephony switches, modems, cellular communication towers, and the like. Network 185 can include line based and/or wireless communication pathways.

As used herein, presented data store 145 can be a physical or virtual storage space configured to store digital information. Data store 145 can be physically implemented within any type of hardware including, but not limited to, a magnetic disk, an optical disk, a semiconductor memory, a digitally encoded plastic memory, a holographic memory, or any other recording medium. Data store 145 can be stand-alone storage units as well as a storage unit formed from a plurality of physical devices. Additionally, information can be stored within data store 145 in a variety of manners. For example, information can be stored within a database structure or can be stored within one or more files of a file storage system, where each file may or may not be indexed for information searching purposes. Further, data store 145 can utilize one or more encryption mechanisms to protect stored information from unauthorized access.

Figure 2:
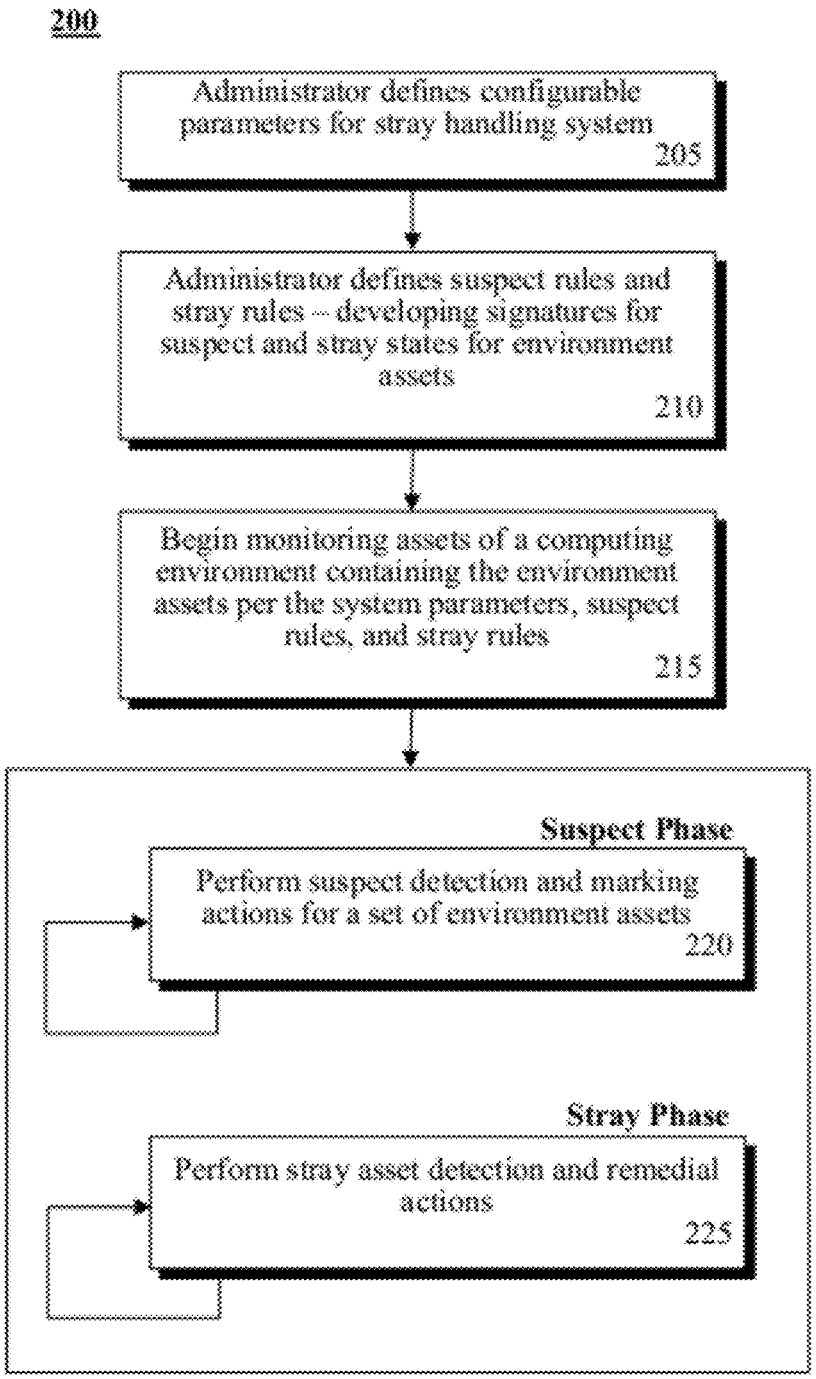
FIG. 2 is a flow chart of a method describing an overview of the stray functionality system operation in accordance with an embodiment of the inventive arrangements disclosed herein.

FIG. 2 is a flow chart of a method 200 for detecting stray ones of environment assets and for taking resolution actions in accordance with embodiments of the inventive arrangements disclosed herein. Method 200 can be performed within the context of system 100 or any other system configured to utilize processing rules, operational characteristics, or signatures of asset conditions to identity stray actions.

Method 200 can begin in step 205 where an administrator can define configurable parameters for a stray handling system. In step 210, the administrator can define suspect and stray rules for the system. This can involve developing signatures or sets of characteristics for suspect and stray states for environment assets. The signatures rules or characteristic sets, can vary based on asset type of computing environment specifics.

In step 215, the monitoring of assets can begin. The assets can include environmental assets, which are operational assets of a computing environment. The monitoring can be in accordance with the configured parameters of step 205. Monitoring can also use the suspect and stray rules defined in step 210. After the rules and system parameters have been established, suspect phase actions (220) and stray phase actions (225) can be performed. In the suspect phase, a subset of normal environment assets can be detected as being suspect assets, as shown by step 220. The suspect phase can also determine that assets marked as suspect are to be reclassified as normal environment assets. In the stray phase, the suspect assets can be analyzed to determine which ones are to stray assets, as shown by step 225. As also shown by step 225, remedial actions can be taken for the stray assets, where remedial assets can include placing stray assets in a containment area, deleting a stray asset, sending a notification message or alert, and other such actions.

The suspect phase (also referred to as the discovery phase) and the stray phase (also referred to as a confirmation phase) may be performed in parallel. Further, even within each phase (suspect and stray phases), different sets of assets can be handled by different devices that also execute in parallel. Additionally, the suspect phase can have N number of cycles for M cycles of the stray phase, where N and M are different integers.

Figure 3:
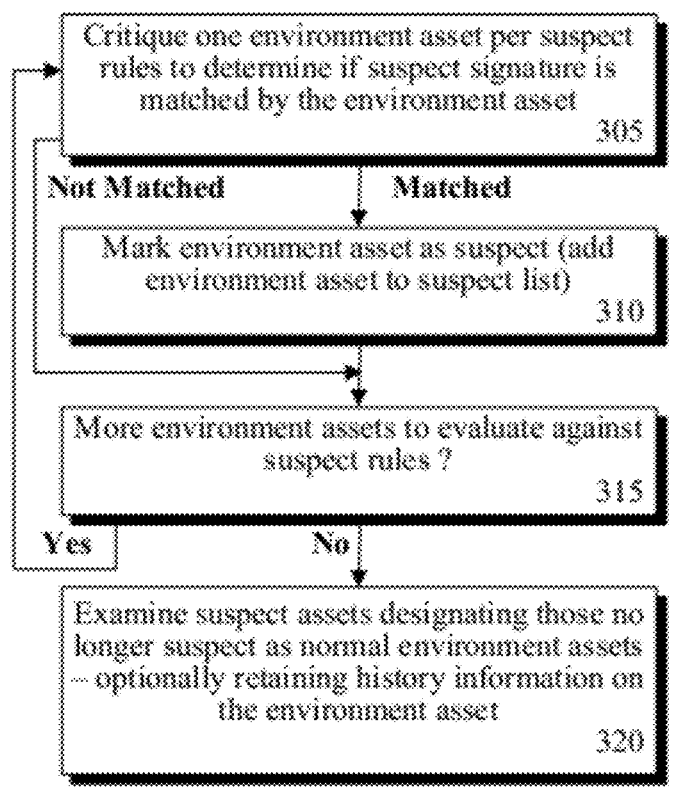
FIG. 3 is a flow chart of a method illustrating the operation of the suspect phase of a stray functionality system in accordance with an embodiment of the inventive arrangements disclosed herein.

FIG. 3 shows a sample process 300 for a suspect phase (e.g. phase 220) for handling stray assets in accordance with an embodiment of the inventive arrangements disclosed herein. Process 300 can start in step 305, where one or more environment assets can be critiqued using the suspect rules to determine if the environment asset matches a suspect signature (or set of characteristics defined for a suspect asset). If so, step 310 can execute, where the environment asset is marked as suspect. In one embodiment, this can involve adding a pointer to the asset to a suspect list. In another embodiment, a flag or metadata tag can exist for the asset, which can be toggled to a suspect asset value. Further, specifics of why the asset is being marked as suspect can be optionally recorded.

For example, in one embodiment, a consistent set of X number of suspect readings may be required before a suspect asset can be "promoted" to a stray asset. When an optional condition indicates a suspect asset is functionally in a normal manner (e.g., it is no longer suspect), then the number X can be reset and/or the suspect action can be remarked as "normal" or non-suspect (as shown by step 320, for example).

In step 315, the process 300 can determine if more environment assets are to be evaluated using the suspect rules. If so, the process can progress from step 315 to step 305, where another environment asset can be evaluated.

Otherwise, step 320 can execute, where an examination of those assets marked as suspect can occur. More specifically, the suspect assets can be examined against operational conditions to assess whether the suspect assets should be re-designated as normal environment assets, which are no longer suspect. If so, suspect actions can be re-categorized. In one embodiment, history information on the environment asset can be retained. This historic information can be used by one or more of the suspect and/or stray rules.

Figure 4:
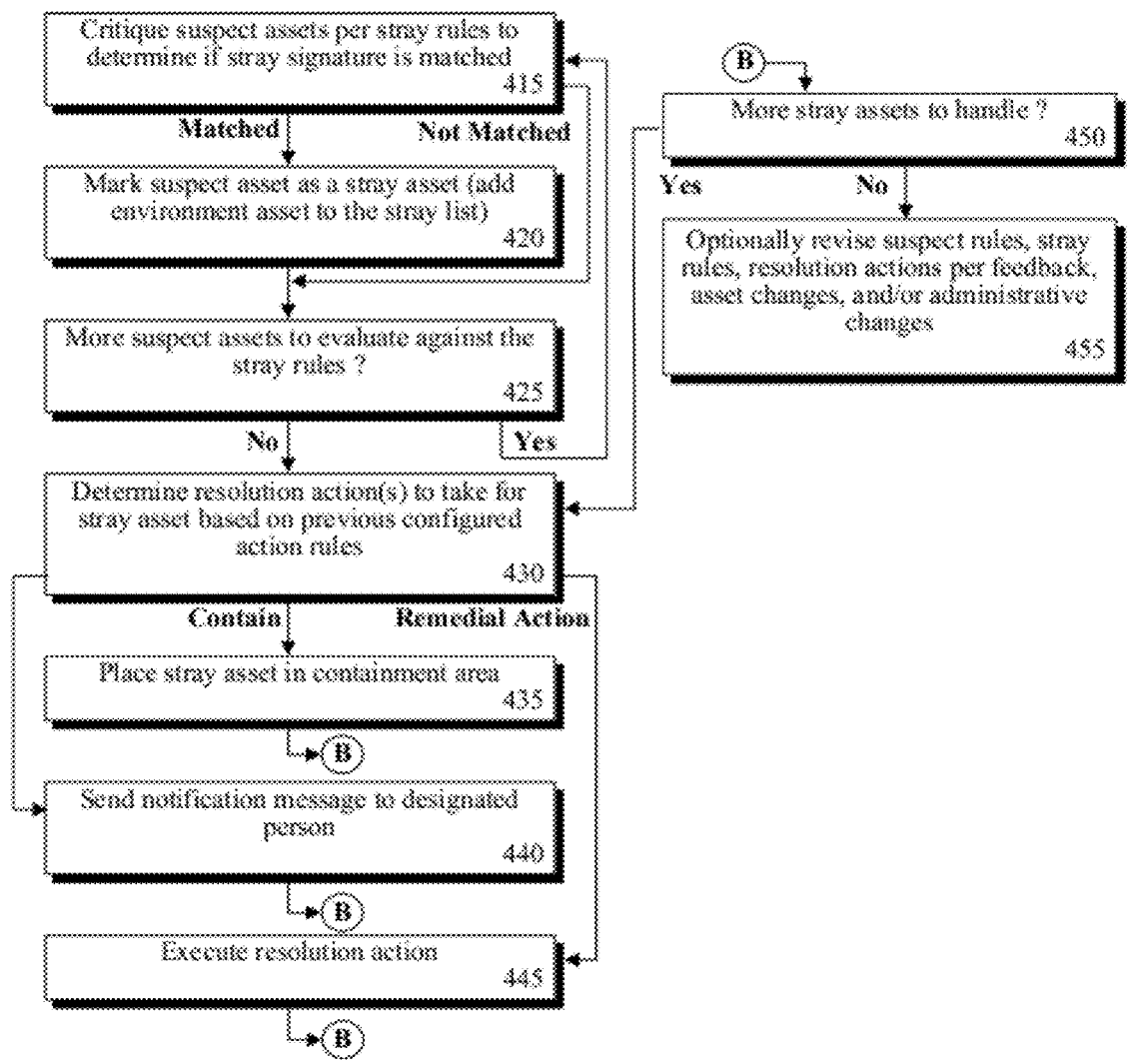
FIG. 4 is a flow chart of a method illustrating the operation of a stray phase of a stray functionality system in accordance with embodiments of the inventive arrangements disclosed herein.

FIG. 4 shows a sample process 400 for a stray phase (e.g. phase 225) for handling stray assets in accordance with an embodiment of the inventive arrangements disclosed herein. Process 400 can start in step 415, where suspect assets can be critiqued using stray rules. The stray rules can define a set of characteristics or a stray signature, to which operational conditions of the suspect actions can be compared. When successfully matched against a stray signature, the suspect asset can be marked as a stray asset, as shown by step 420. Step 425 can execute to check more suspect assets against the stray rules. If more assets are to be checked, the method can proceed from step 425 to step 415.

In step 430, a one or more resolution actions, which are to be taken for a stray asset, can be determined. In one embodiment, previously configured action rules can dictate which resolution action or actions are to be taken. One such resolution action is to send a notification message to a designated person, as shown by step 440. The action rules can dictate that a different remedial action or resolution action be performed, as shown by step 445. One contemplated resolution action is to delete or de-allocate the stray asset.

Another resolution action is to place a stray asset in a containment area, as shown by step 435. Use of a containment area 435 can be useful to quarantine stray assets so they do not negatively affect an operational computing environment. A contained asset (or quarantined) asset can be returned to the computing environment, should it be needed for some reason. Thus, it may be more conservative or safer to perform a containment resolution action instead of to just delete or de-allocate the stray asset.

Step 450 can check to see if more there are more stray assets that are to be handled. If so, the method can progress from step 450 back to step 430, where resolution actions for the next stray asset can be taken. Otherwise, in step 455, suspect rules, stray rules, resolution actions and the like can be modified. This modification can occur as part of a feedback loop, such as one existing for a self-correcting system. The modification of step 455 can also result from an administrative change by an authorized administrator. The modification of step 455 can also result from a change of a configuration management system, such as the creation, deletion, or modification of a configuration item, which results in a change of environment assets in the computing environment. In other words, new or different environment assets may require asset specific suspect rules, stray rules, and/or resolution actions.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be handled substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for identifying and resolving stray assets, the method comprising:
   configuring and monitoring a set of operational characteristics of a plurality of environment assets of a computing environment, wherein the operational characteristics comprise values of various attributes that are specific to a type of environment asset or the conditions that the environment asset is operating under,
      wherein environment assets comprise dynamically defined configuration items (CIs) of an configuration management (CM) system used to perform activities of the computing environment;
   configuring a set of suspect rules comprising a set of suspect asset characteristics specific to the type of environment asset, wherein the suspect asset characteristics comprise a set of conditional operational characteristics that define acceptable or abnormal operating states of the environment asset,
      wherein a suspect asset comprises an environment asset whose functionality is potentially stray, wherein suspect assets are a subset of environment assets;
   configuring a set of stray rules comprising a set of stray asset characteristics specific to the type of environment asset, wherein the stray asset characteristics comprise a set of relationships that take into account the number of suspect asset detections, time parameters, or the operating context of the environment asset,
      wherein the stray asset characteristics are indicative of an environment asset of that type having a likelihood of being a stray asset,
      wherein a stray asset comprises an unreturned environment asset that is left in an enabled or active state when an intended lifespan of the environment asset has ended and is consuming resources of the computing environment yet is not needed by active processes of the computing environment and is unneeded by other active environment assets, wherein stray assets are a subset of suspect assets, and
      wherein the stray rules further comprise one or more predefined resolution actions for handling stray assets, wherein the stray rules further dictate which resolution actions are to be taken;
   detecting at least one environment asset of a computing environment as being a stray asset, the detecting comprising:
      utilizing the set of suspect rules to compare the set of suspect asset characteristics specific to the type of environment asset against the set of operational characteristics of the environment asset being monitored in order to determine whether each environment asset is to be considered a suspect asset or a standard asset, and
      utilizing the set of stray rules to compare the set of stray asset characteristics specific to the type of environment asset against the set of operational characteristics of the environment asset being monitored in order to determine whether each suspect asset is to be considered a stray asset or a standard asset; and
   performing at least one predefined resolution action for each detected stray asset, wherein said resolution action is selected from a group of actions, said selected one from the group of actions being an alert action which sends a message to an administrator about the stray asset, a containment action that isolates the stray asset from the computing environment, or a delete action to remove the stray asset from the computing environment and free related computing resources,
      wherein said at least one resolution action is selected based on a determined probability that the environment asset is actually a stray asset.

2. The method of claim 1, wherein the suspect rules are expected to determine a likely set of stray assets along with an expected and significant set of false positive results, and wherein the stray rules are expected to reduce the number of false positive results.

3. The method of claim 2, wherein utilizing the set of suspect rules further comprises a discovery stage for detecting suspect assets, wherein utilizing the set of stray rules further comprises a confirmation stage for determining suspect assets to be stray assets, and wherein the discovery stage executes in parallel with the confirmation stage.

4. The method of claim 3, wherein a frequency of a cycle of the discovery stage is different than a frequency of a cycle of the confirmation stage, and wherein a plurality of discovery stage cycles are run for each confirmation stage cycle.

5. The method of claim 1, wherein each of the environment assets are persistent assets having an expected lifespan of greater than one day.

6. The method of claim 1, wherein the set of operational characteristics further comprises at least one of security settings, parent processes, metadata, versioning information, file attributes and configuration data associated with the environment asset.

7. The method of claim 2, further comprising:
   determining a probability that the detected stray asset is a false positive result, and is therefore not actually a stray asset even though it has been indicated as such;
   when the determined probability is within a first range of values, executing an alert action as the resolution action;
   when the determined probability is within a second range of values, executing a containment action as the resolution action; and
   when the determined probability is within a third range of values, executing the delete action as the resolution action.

8. The method of claim 1, wherein the at least one resolution action is the alert action.

9. The method of claim 1, wherein the at least one resolution action is the containment action.

10. The method of claim 1, wherein the at least one resolution action is the delete action.

11. A computer program product comprising a non-transitory computer readable storage medium having computer usable program code embodied therewith, wherein when executed by a processor the computer usable program code is operable to:
   configure and monitor a set of operational characteristics of a plurality of environment assets of a computing environment, wherein the operational characteristics comprise values of various attributes that are specific to a type of environment asset or the conditions that the environment asset is operating under, wherein environment assets comprise dynamically defined configuration items (CIs) of an configuration management (CM) system used to perform activities of the computing environment;

configure a set of suspect rules comprising a set of suspect asset characteristics specific to the type of environment asset, wherein the suspect asset characteristics comprise a set of conditional operational characteristics that define acceptable or abnormal operating states of the environment asset, wherein a suspect asset comprises an environment asset whose functionality is potentially stray, wherein suspect assets are a subset of environment assets;

configure a set of stray rules comprising a set of stray asset characteristics specific to the type of environment asset, wherein the stray asset characteristics comprise a set of relationships that take into account the number of suspect asset detections, time parameters, or the operating context of the environment asset, wherein the stray asset characteristics are indicative of an environment asset of that type having a likelihood of being a stray asset, wherein a stray asset comprises an unreturned environment asset that is left in an enabled or active state when an intended lifespan of the environment asset has ended and is consuming resources of the computing environment yet is not needed by active processes of the computing environment and is unneeded by other active environment assets, wherein stray assets are a subset of suspect assets, and wherein the stray rules further comprise one or more predefined resolution actions for handling stray assets, wherein the stray rules further dictate which resolution actions are to be taken;

detect at least one environment asset of a computing environment as being a stray asset, the detecting comprising:
utilizing the set of suspect rules to compare the set of suspect asset characteristics specific to the type of environment asset against the set of operational characteristics of the environment asset being monitored in order to determine whether each environment asset is to be considered a suspect asset or a standard asset, and utilizing the set of stray rules to compare the set of stray asset characteristics specific to the type of environment asset against the set of operational characteristics of the environment asset being monitored in order to determine whether each suspect asset is to be considered a stray asset or a standard asset; and perform at least one predefined resolution action for each detected stray asset, wherein said resolution action is selected from a group of actions, said selected one from the group of actions being an alert action which sends a message to an administrator about the stray asset, a containment action that isolates the stray asset from the computing environment, or a delete action to remove the stray asset from the computing environment and free related computing resources, wherein said at least one resolution action is selected based on a determined probability that the environment asset is actually a stray asset.

12. The computer program product of claim 11, wherein the suspect rules are expected to determine a likely set of stray assets along with an expected and significant set of false positive results, wherein the stray rules are expected to reduce the number of false positive results, and wherein when executed by the processor the computer usable program code is further operable to:

determine a probability that the detected stray asset is a false positive result, and is therefore not actually a stray asset even though it has been indicated as such;

when the determined probability is within a first range of values, execute an alert action as the resolution action;

when the determined probability is within a second range of values, execute a containment action as the resolution action; and when the determined probability is within a third range of values, execute the delete action as the resolution action.

13. A system for identifying and resolving stray assets comprising:

a processor for executing a set of instructions;

a non-transitory computer readable storage medium for storing at least one computer program product comprising the set of instructions; and a bus communicatively linking the processor and the storage medium, wherein the processor executing the instructions of the at least one computer program product causes the system to:

configure and monitor a set of operational characteristics of a plurality of environment assets of a computing environment, wherein the operational characteristics comprise values of various attributes that are specific to a type of environment asset or the conditions that the environment asset is operating under, wherein environment assets comprise dynamically defined configuration items (CIs) of an configuration management (CM) system used to perform activities of the computing environment;

configure a set of suspect rules comprising a set of suspect asset characteristics specific to the type of environment asset, wherein the suspect asset characteristics comprise a set of conditional operational characteristics that define acceptable or abnormal operating states of the environment asset, wherein a suspect asset comprises an environment asset whose functionality is potentially stray, wherein suspect assets are a subset of environment assets;

configure a set of stray rules comprising a set of stray asset characteristics specific to the type of environment asset, wherein the stray asset characteristics comprise a set of relationships that take into account the number of suspect asset detections, time parameters, or the operating context of the environment asset, wherein the stray asset characteristics are indicative of an environment asset of that type having a likelihood of being a stray asset, wherein a stray asset comprises an unreturned environment asset that is left in an enabled or active state when an intended lifespan of the environment asset has ended and is consuming resources of the computing environment yet is not needed by active processes of the computing environment and is unneeded by other active environment assets, wherein stray assets are a subset of suspect assets, and wherein the stray rules further comprise one or more predefined resolution actions for handling stray assets, wherein the stray rules further dictate which resolution actions are to be taken;

detect at least one environment asset of a computing environment as being a stray asset, the detecting comprising:
utilizing the set of suspect rules to compare the set of suspect asset characteristics specific to the type of environment asset against the set of operational characteristics of the environment asset being monitored in order to determine whether each environment asset is to be considered a suspect asset or a standard asset, and utilizing the set of stray rules to compare the set of stray asset characteristics specific to the type of environment asset against the set of operational characteristics of the environment asset being monitored in order to determine whether each suspect asset is to be considered a stray asset or a standard asset; and perform at least one predefined resolution action for each detected stray asset, wherein said resolution action is selected from a group of actions, said selected one from the group of actions being an alert action which sends a message to an administrator about the stray asset, a containment action that isolates the stray asset from the computing environment, or a delete action to remove the stray asset from the computing environment and free related computing resources, wherein said at least one resolution action is selected based on a determined probability that the environment asset is actually a stray asset.

14. The system of claim 13, wherein the suspect rules are expected to determine a likely set of stray assets along with an expected and significant set of false positive results, wherein the stray rules are expected to reduce the number of false positive results, and wherein the processor executing the instructions of the at least one computer program product further causes the system to:

determine a probability that the detected stray asset is a false positive result, and is therefore not actually a stray asset even though it has been indicated as such;

when the determined probability is within a first range of values, execute an alert action as the resolution action;

when the determined probability is within a second range of values, execute a containment action as the resolution action; and when the determined probability is within a third range of values, execute the delete action as the resolution action.

15. A system for identifying and resolving stray asset characteristics comprising:

a computing environment having a plurality of environment assets, wherein said plurality of environment assets are used to perform activities of the computing environment;

a plurality of processing rules defining conditions for identifying, confirming, and taking a resolution action for stray assets existing in the computing environment, wherein each of the processing rules are specific to a type of environment asset so that each different type of asset is associated with a different set of processing rules, wherein a set of the processing rules comprise suspect rules for determining which of the environment assets are suspect assets, wherein the suspect rules comprise user-defined normal operating conditions for the plurality of environment assets, wherein a set of the processing rules comprise stray rules for determining which of the suspect assets are stray assets, wherein the stray rules comprise user-defined conditions that define an operating context under which a function of the environment asset is deemed to be stray and a resolution action to return the environment asset to a normal operating state, and wherein a stray asset comprises an unreturned environment asset that is left in an enabled or active state when an intended lifespan of the environment asset has ended and is consuming resources of the computing environment yet is not needed by active processes of the computing environment and is unneeded by other active environment assets; and a stray asset handling system configured to utilize the suspect rules to detect which of the environment assets are suspect assets, to utilize the stray rules to detect which of the suspect assets are stray assets, and to take resolution actions against the stray assets to free up computing resources of the computing environment for each of the stray assets, wherein the stray asset handling system further comprises:

a suspect detector configured to utilize the suspect rules to identify environment assets that potentially have stray asset characteristics, but which also have a significant likelihood of not being stray assets;

a suspect asset log configured to store data for environment assets identified by the suspect detector as operating in an unknown or undefined state;

a current suspect list configured to contain unique identifiers for environment assets identified by the suspect detector as potential stray assets needing further processing;

a stray list configured to contain historical data for environment assets previously confirmed as having stray asset characteristics, including unique identifiers for stray assets and pertinent operating parameters of stray assets;

a stray evaluator configured to utilize the stray rules, the suspect asset log, the current suspect list, and the stray list to confirm an existence of stray asset characteristics for environment assets contained in the current suspect list;

a dashboard user interface configured to allow a human agent to access pertinent records and perform predetermined activities with the stray asset handling system; and a rules interface configured to allow a human agent to define and modify the plurality of processing rules.

16. The system of claim 15, wherein each of the environment assets are persistent assets that are dynamically configured configuration items (CIs) of an asset management system having an expected lifespan of greater than one day.

17. The system of claim 15, further comprising:

a containment area of a data store configured to contain environment assets having confirmed stray asset characteristics, wherein said containment area isolates the environment asset from the computing environment.

* * * * *